(12) United States Patent
Huo

(10) Patent No.: US 12,722,079 B2
(45) Date of Patent: Sep. 1, 2026

(54) DISPLAY METHOD AND APPARATUS OF SCENE PICTURE, TERMINAL, AND STORAGE MEDIUM

(71) Applicant: Tencent Technology (Shenzhen) Company Limited, Shenzhen (CN)

(72) Inventor: Yixi Huo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 394 days.

(21) Appl. No.: 18/220,778

(22) Filed: Jul. 11, 2023

(65) Prior Publication Data

US 2023/0347240 A1 Nov. 2, 2023

Related U.S. Application Data

(63) Continuation of application No. PCT/CN2022/128082, filed on Oct. 27, 2022.

(30) Foreign Application Priority Data

Jan. 7, 2022 (CN) ........................ 202210016658.6

(51) Int. Cl.
*A63F 13/5258* (2014.01)
*A63F 13/60* (2014.01)
(Continued)

(52) U.S. Cl.
CPC .......... *A63F 13/5258* (2014.09); *A63F 13/60* (2014.09); *G06T 13/40* (2013.01);
(Continued)

(58) Field of Classification Search
CPC ...... A63F 13/5258; A63F 13/56; A63F 13/52; A63F 13/833
See application file for complete search history.

(56) References Cited

U.S. PATENT DOCUMENTS 10,956,740 B1 * 3/2021 Vanderdrift ............ G06V 20/20
2011/0306417 A1 * 12/2011 Sheblak .................. A63F 13/52 463/32

(Continued)

FOREIGN PATENT DOCUMENTS

CN 104246795 A 12/2014
CN 111142669 A 5/2020

(Continued)

OTHER PUBLICATIONS

Ultra Street Fighter IV video game published by Capcom and first released on Apr. 17, 2014 as evidenced by Fandom.com publication is available online at https://streetfighter.fandom.com/wiki/Ultra_Street_Fighter_IV (Year: 2014).*

(Continued)

*Primary Examiner* — James S. McClellan
(74) *Attorney, Agent, or Firm* — Morgan, Lewis & Bockius LLP

(57) ABSTRACT

This application relates to a method of displaying a scene picture performed by a computer device. The method includes: displaying a two-dimensional scene picture of a virtual scene, the scene picture including a virtual object; in response to a triggering condition being met, playing a three-dimensional animation corresponding to the virtual scene; and in response to completing playing the three-dimensional animation, displaying the virtual object in a target posture at a target position in the two-dimensional scene picture corresponding to an ending segment of the three-dimensional animation.

18 Claims, 12 Drawing Sheets

(51) Int. Cl.
*G06T 13/40* (2011.01)
*G06T 13/80* (2011.01)
*G06T 19/20* (2011.01)

(52) U.S. Cl.
CPC .............. *G06T 13/80* (2013.01); *G06T 19/20* (2013.01); *G06T 2219/2016* (2013.01)

(56) References Cited

U.S. PATENT DOCUMENTS

| | | | | |
|---|---|---|---|---|
| 2014/0274373 | A1 | 9/2014 | Olshan et al. | |
| 2015/0310660 | A1 * | 10/2015 | Mogilefsky | G06T 1/60 345/422 |
| 2019/0168117 | A1 * | 6/2019 | Miyazaki | A63F 13/20 |
| 2020/0066022 | A1 | 2/2020 | Leong et al. | |

FOREIGN PATENT DOCUMENTS

| | | | |
|---|---|---|---|
| CN | 111803945 | A | 10/2020 |
| CN | 111888759 | A | 11/2020 |
| JP | 2003141560 | A | 5/2003 |
| JP | 2007272267 | A | 10/2007 |
| JP | 2011024636 | A | 2/2011 |
| JP | 2016067923 | A | 5/2016 |

OTHER PUBLICATIONS

YouTube video titled The USF4 Guidebook—Park 2: Intermediate—Street Fighter Tutorial by MetalMusicMan on Jul. 20, 2014 and available online at https://www.youtube.com/watch?v=Wf35PwXonb0 (Year: 2014).*

Tencent Technology, Japanese Office Action, JP Patent Application No. 2024-523780, 25APR2025, 6 pgs.

GameWatch.com, ""(Super) Street Fighter IV" Graphics Lesson for 3D Game Fans (Part 2) The Masterful Techniques of Bringing 2D Fighting Game Style to 3D Graphics are Now Revealed", Dec. 2011, Retrieved from the Internet: https://game.watch.impress.co.jp/docs deg/494567.html.

YouTube.com, Fighting Game Video, "Ultra Street Fighter IV Super Special Moves", Feb. 2016, Retrieved from the Internet: https://www.youtube.com/watch?v=_i63ppMS7Vg.

Tencent Technology, ISR, PCT/CN2022/128082, Jan. 16, 2023, 2 pgs.

Tencent Technology, WO, PCT/CN2022/128082, Jan. 16, 2023, 4 pgs.

Tencent Technology, Korean Office Action, KR Patent Application No. 10-2024-7008762, Jul. 9, 2025, 16 pgs.

YouTube.com, "Ultra Street Fighter IV Super Special Moves", Feb. 2016, Retrieved from the Internet: https://www.youtube.com/watch?v=_i63qqMS7Vg.

Tencent Technology, Japanese Office Action, JP Patent Application No. 2024-523780, Oct. 10, 2025, 7 pgs.

Rensai.jp, "Guilty Gear Strive Review: A Game that Broadens the Reach of the Fighting Game Community!", Jun. 2021, Retrieved from the Internet: https://rensai.jp/353500.

YouTube.com, "Guilty Gear-Strive-'s Faust Goes on a Tricky Rampage", Jun. 2021, Retrieved from the Internet: https://www.youtube.com/watch?v=er-fUL6ErdM.

Douyin.com, "#StreetFighter4AllCharactersSpecialMoves, #MyBiggestSurprise #GameHighlights", May 2021, Retrieved from the Internet: https://www.douyin.com/video/6968400227665513768.

* cited by examiner

| Transformation | | | | | | |
|---|---|---|---|---|---|---|
| Position | X | 86.0 | Y | 0.0 | Z | 0.0 |
| Rotation | X | 0.0° | Y | 0.0° | Z | 0.0° |
| Scaling | X | 1.0 | Y | 1.0 | Z | 1.0 |

(a)

(b)

(a)

(b)

DISPLAY METHOD AND APPARATUS OF SCENE PICTURE, TERMINAL, AND STORAGE MEDIUM

CROSS-REFERENCE TO RELATED APPLICATIONS

This application is a continuation application of PCT Patent Application No. PCT/CN2022/128082, entitled "DISPLAY METHOD AND APPARATUS OF SCENE PICTURE, TERMINAL, AND STORAGE MEDIUM" filed on Oct. 27, 2022, which claims priority to Chinese Patent Application NO. 202210016658.6, entitled "DISPLAY METHOD AND APPARATUS OF SCENE PICTURE, TERMINAL, AND STORAGE MEDIUM" filed on Jan. 7, 2022, all of which is incorporated by reference in its entirety.

FIELD OF THE TECHNOLOGY

This application relates to the technical field of computers, and particularly relates to a display method and apparatus of a scene picture, a terminal, and a storage medium.

BACKGROUND OF THE DISCLOSURE

With the diversification of terminal functions, more and more kinds of games can be played on the terminal. A side-scrolling action mobile game is a relatively popular game, and a user can control a virtual object to move in a two-dimensional virtual scene. Such game usually contains three-dimensional scenario animations and skill animations, and how to connect a three-dimensional animation with a two-dimensional scene picture is a problem to be solved.

SUMMARY

Embodiments of this application provide a display method and apparatus of a scene picture, a terminal, and a storage medium. When switching from a three-dimensional skill animation to a two-dimensional scene picture of a virtual scene, the connection can be smooth, which improves the smoothness of a picture connection and a display effect. The technical solutions are as follows.

In one aspect, a method of displaying a scene picture is performed by a computer device according to embodiments of this application, the method including:

- displaying a two-dimensional scene picture of a virtual scene, the scene picture including a virtual object;
- in response to a triggering condition being met, playing a three-dimensional animation corresponding to the virtual scene; and
- in response to completing playing the three-dimensional animation, displaying the virtual object in a target posture at a target position in the two-dimensional scene picture corresponding to an ending segment of the three-dimensional animation.

In another aspect, a computer device is provided. The computer device includes a processor and a memory. The memory is configured to store at least one computer program, and the at least one computer program is loaded and executed by the processor and causing the computer device to implement the method of displaying a scene picture in embodiments of this application.

In another aspect, a non-transitory computer-readable storage medium is provided. The computer-readable storage medium stores at least one computer program, and the at least one piece of computer program is loaded and executed by a processor of a computer device and causing the computer device to implement the method of displaying a scene picture in embodiments of this application.

DESCRIPTION OF EMBODIMENTS

Figures 1, 2:
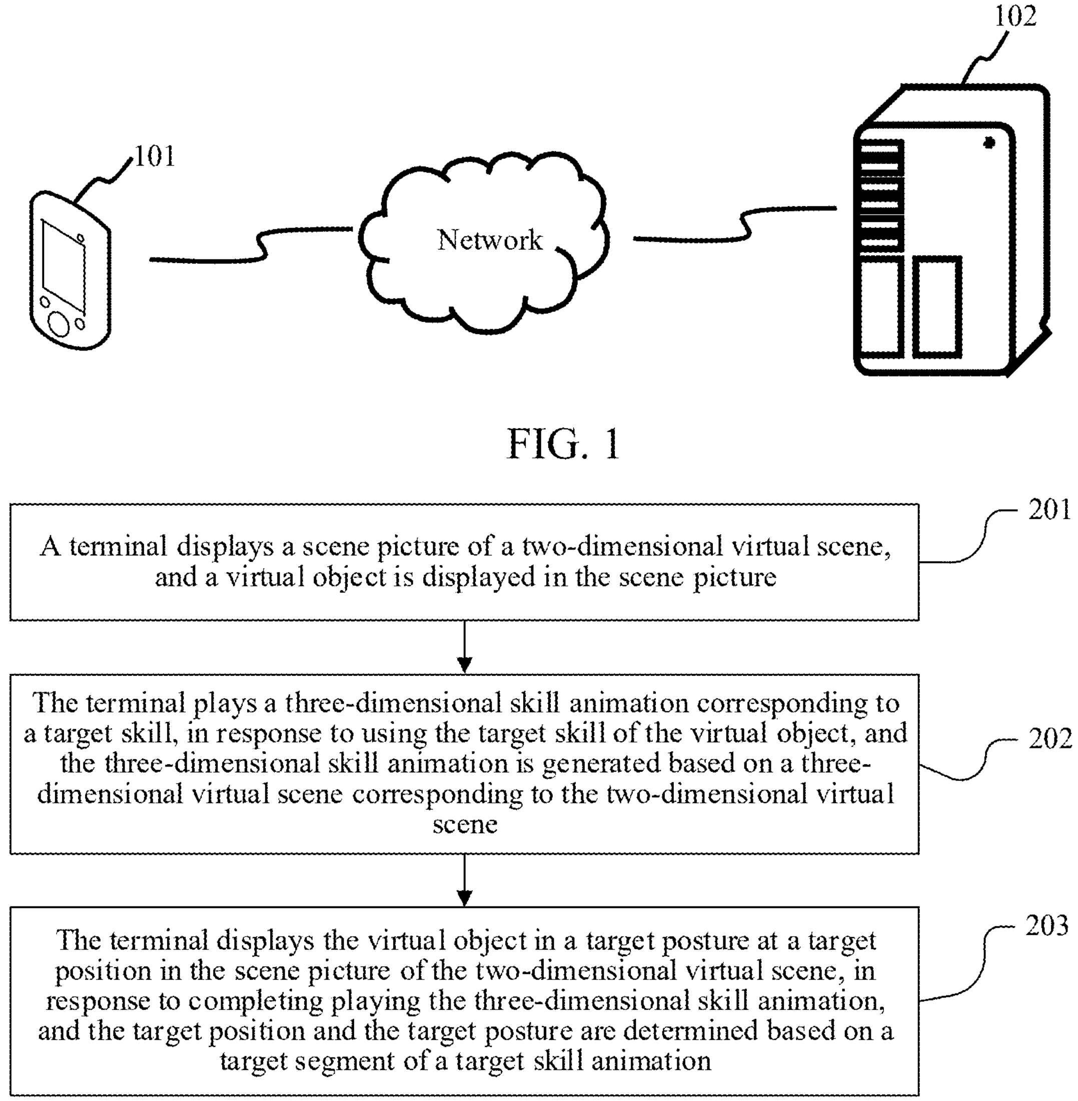
FIG. 1 is a schematic diagram of an implementation environment of a display method of a scene picture according to an embodiment of this application.
FIG. 2 is a flowchart of a display method of a scene picture according to an embodiment of this application.

At present, a clipping mode is usually used for connecting, that is, after completing playing a scenario animation or a skill animation, directly switching to a two-dimensional scene picture of a virtual scene. Such switching mode is very abrupt, resulting in poor smoothness of a virtual scene picture connection and a poor display effect.

To facilitate understanding, the following explains terms involved in embodiments of this application.

Virtual scene: refers to a virtual scene displayed (or provided) when an application runs on a terminal. The virtual scene may be a simulation environment for a real world, a semi-simulation semi-fictional virtual scene, or a purely fictional virtual scene. The virtual scene may be a two-dimensional virtual scene, a 2.5-dimensional virtual scene, or a three-dimensional virtual scene. For example, the virtual scene may include a sky, a land, a sea, etc., and the land may include an environmental element such as a desert and a city. A user may control a virtual object to move in the virtual scene.

Virtual object: refers to a movable object in a virtual world. The movable object may be at least one of a virtual character, a virtual animal, and an animation character. In some embodiments, when the virtual world is a three-dimensional virtual world, the virtual object is a three-dimensional stereoscopic model, and each virtual object has its shape and volume in the three-dimensional virtual world, occupying a part of the space in the three-dimensional virtual world. In some embodiments, the virtual object is a three-dimensional role constructed based on three-dimensional human skeleton technology, and the virtual object realizes different appearances by wearing different skins. In some embodiments, the virtual object can be implemented using 2.5-dimensional or 2-dimensional models, and embodiments of this application do not limit this.

Side-scrolling: refers to a type of game in which a movement route of a game role is controlled on a horizontal picture and the game role moves only from left to right or from right to left in the virtual scene. In the entire virtual scene picture or most of the virtual scene picture in a side-scrolling game, the movement route of the game role is performed along a horizontal direction. According to the content, the side-scrolling game is divided into side-scrolling clearance, side-scrolling adventure, side-scrolling competition, side-scrolling strategy, and other games. According to the technology, the side-scrolling game is divided into a two-dimensional side-scrolling game and a three-dimensional side-scrolling game.

Action game: refers to a type of game, which emphasizes the user's reaction ability and hand-eye cooperation.

Mobile game: refers to a game running on a mobile terminal device (a tablet computer, a mobile phone, etc.), and mostly refers to mobile phone game.

Oyi: refers to a hidden skill of the virtual object in the game. Each virtual object manipulated by the user has a hidden or secret skill called Oyi, and the virtual object manipulated by the user may use Oyi if conditions are satisfied during a battle. Compared with ordinary skills, Oyi has more gorgeous visual performance effects, such as lens transformations and role close-ups.

Perspective: refers to a method of describing a spatial relationship of objects on a plane. When the virtual object moves from left to right in parallel, virtual objects located in different positions of the virtual scene picture will have inconsistent impressions due to the perspective, and virtual objects located in different positions cannot coincide.

Perspective correction: refers to a method of removing a perspective effect of the virtual object. To let a player grasp key information of the virtual object better and achieve the best performance effect in the side-scrolling game, the perspective effect of the virtual object is removed by using special means. The size and angle of moving the virtual object after the perspective correction to various positions of the virtual scene picture look the same.

Side-scrolling lens: refers to a lens capable of moving in a two-dimensional direction. Due to the use of perspective correction technology, the viewing angle of the virtual scene picture when the user controls the virtual object is fixed. When the virtual object moves in the virtual scene, the size displayed in the virtual scene picture does not change. The two-dimensional lens is referred to as the side-scrolling lens in embodiments of this application.

3-Dimension (3D) lens: refers to a lens capable of moving in a three-dimensional direction. A virtual scene picture photographed by the 3D lens is distinguished from a picture under other viewing angles of the side-scrolling lens, such as a three-dimensional skill animation and three-dimensional scenario animation. Unlike the side-scrolling lens, the 3D lens does not use the perspective correction technology for the picture. The three-dimensional lens is referred to as the 3D lens in embodiments of this application.

One-take: refers to a common photographing method in a movie, which continuously photographs one scene and one show, and simply switches camera angles to realize transitions in a non-editing way.

Three-dimensional software: refers to software configured to make a three-dimensional animation, and may output role actions and lens information to an engine. For example, maya (a kind of three-dimensional animation software applied to scenes such as professional film and television advertisements, role animations, and movie tricks), 3D studio max (3Dmax, which is a kind of three-dimensional animation rendering and production software), lightwave (a kind of three-dimensional animation production software), etc.

Engine: refers to game development software used when making a game, such as unreal engine 3, unreal engine 4, and unreal engine 5.

A display method of a scene picture provided by embodiments of this application can be performed by a terminal, and an implementation environment of the display method of a scene picture provided by embodiments of this application is described below. FIG. 1 is a schematic diagram of an implementation environment of a display method of a scene picture according to an embodiment of this application. Referring to FIG. 1, the implementation environment includes a terminal 101 and a server 102. The terminal 101 and the server 102 can be directly or indirectly connected through wired or wireless communication, and this application is not limited thereto.

In some embodiments, the terminal 101 may be a smartphone, a tablet computer, a laptop computer, a desktop computer, etc., but is not limited thereto. The terminal 101 is installed with an application supporting the virtual scene. The application is any one of a side-scrolling action mobile game, a third-person shooting game, a virtual reality application, a three-dimensional map program, or a multi-person gun battle survival game. The terminal 101 is a terminal used by the user, and a user account is logged in. The user uses the terminal 101 to operate the virtual object located in the virtual scene to perform an activity, and the activity includes but is not limited to: at least one of adjusting body postures, crawling, walking, running, riding, jumping, attacking, and releasing skills. The virtual object is the virtual character, such as a simulation character role or an animation character role. It should be noted that, a number of the terminal may be more or less. For example, the terminal is one, or the terminal is dozens or hundreds, or more. Embodiments of this application do not limit the number of terminals and device types.

In some embodiments, the server 102 can be a stand-alone physical server, a server cluster or distributed system of a plurality of physical servers, and a cloud server that provides basic cloud computing services such as cloud services, cloud databases, cloud computing, cloud functions, cloud storage, network services, cloud communications, middleware services, domain name services, security services, content delivery networks (CDN), and large data and artificial intelligence platforms. The server 102 is configured to provide background services for applications that support the virtual scene. In some embodiments, the server 102 undertakes the primary computing work, and the terminal 101 undertakes the secondary computing work. Alternatively, the server 102 undertakes the secondary computing work, and the terminal 101 undertakes the primary computing work. Alternatively, the server 102 and the terminal 101 both use a distributed computing architecture to perform cooperative computing.

FIG. 2 is a flowchart of a display method of a scene picture according to an embodiment of this application. As shown in FIG. 2, embodiments of this application are described taking the execution by the terminal as an example. The display method of a scene picture includes the following steps.

201. The terminal displays the two-dimensional scene picture of the virtual scene, and the virtual object is displayed in the scene picture.

In embodiments of this application, the terminal is the terminal 101 shown in FIG. 1, and is installed with a game program. The two-dimensional virtual scene is a virtual scene of the game program. The virtual object is displayed in the two-dimensional scene picture of the virtual scene. The virtual object is a virtual object controlled by an account registered by a current terminal, or the virtual object is a virtual object controlled by an account registered by other terminals, or the virtual object is a non-player-controlled character (NPC) in the two-dimensional virtual scene, and embodiments of this application do not limit this.

For example, the virtual object is on a left side of the scene picture in a standing posture; or the virtual object is in a middle of the scene picture in a sword-pulling posture; or the virtual object is on a right side of the scene picture in a lying posture, which is not limited thereto.

It should be noted that, the two-dimensional virtual scene is a three-dimensional virtual space, and an interior of the virtual space is a movable region of the virtual object. The two-dimensional virtual scene is usually presented based on the two-dimensional lens. The two-dimensional lens refers to a lens capable of moving in the two-dimensional direction. The two-dimensional lens can photograph the two-dimensional virtual scene from a fixed viewing angle to obtain the two-dimensional scene picture of the virtual scene so that a presented two-dimensional scene picture is a two-dimensional effect. In other words, a scene picture presented to the user is photographed through the fixed viewing angle so that the virtual object in the virtual scene presents the effect of moving in the two-dimensional direction, and the virtual background displays different contents as the two-dimensional lens moves. In embodiments of this application, such a virtual scene presented through the two-dimensional lens is referred to as the two-dimensional scene picture.

202. The terminal plays a three-dimensional skill animation corresponding to a target skill, in response to using the target skill of the virtual object, and the three-dimensional skill animation is generated based on a three-dimensional virtual scene corresponding to the two-dimensional scene picture.

In embodiments of this application, the target skill is an hidden skill of the virtual object, or an ordinary skill of the virtual object. Each target skill corresponds to one three-dimensional skill animation for presenting a skill action of the target skill performed by the virtual object. The user can trigger the virtual object to release the target skill by triggering the use of the target skill. And then the terminal generates, in response to the use, a corresponding playing instruction for indicating to play the three-dimensional skill animation corresponding to the target skill. The terminal plays the three-dimensional skill animation corresponding to the target skill according to the playing instruction, and presents the three-dimensional skill animation to the user through the screen.

The three-dimensional virtual scene is a three-dimensional virtual space, which is referred to as a first virtual space for the convenience of description. The two-dimensional virtual scene is also a three-dimensional virtual space, which is referred to as a second virtual space for the convenience of description. The second virtual space is a part of the first virtual space, and contents in other regions in the first virtual space are displayed in the second virtual space in the form of a static image as the virtual background of the second virtual space. The three-dimensional skill animation is photographed in the three-dimensional virtual scene based on the 3D lens, which refers to the lens capable of moving in the three-dimensional direction. The scene picture of the virtual scene is photographed in the two-dimensional scene picture based on the two-dimensional lens, which refers to the lens capable of moving in the two-dimensional direction. When the 3D lens and the two-dimensional lens are in corresponding positions, an animation frame photographed by the 3D lens is basically consistent with a content presented by the scene picture photographed by the two-dimensional lens.

203. The terminal displays the virtual object in a target posture at a target position in the two-dimensional scene picture of the virtual scene, in response to completing playing the three-dimensional skill animation, and the target position and the target posture are determined based on a target segment of a target skill animation.

In embodiments of this application, since the target segment is obtained by photographing in the three-dimensional virtual scene, the position and posture of the virtual object in the target segment are not completely consistent with the position and posture of the virtual object in the two-dimensional scene picture of the virtual scene. The target position and the target posture can be determined through the target segment so that the position and the posture of the virtual object are consistent with those in the target segment. Thus, it is not abrupt when the terminal switches from displaying the three-dimensional skill animation to displaying the scene picture.

In solutions proposed in embodiments of this application, after completing playing the three-dimensional skill animation, the target position and the target posture of the virtual object in the two-dimensional scene picture of the virtual scene are determined based on the target segment of the three-dimensional skill animation so that the position and the posture of the virtual object can be consistent with those in the target segment, thereby when switching from the three-dimensional skill animation to the two-dimensional scene picture of the virtual scene, the connection is smooth, which improves the smoothness of a picture connection and a display effect.

Figure 3:
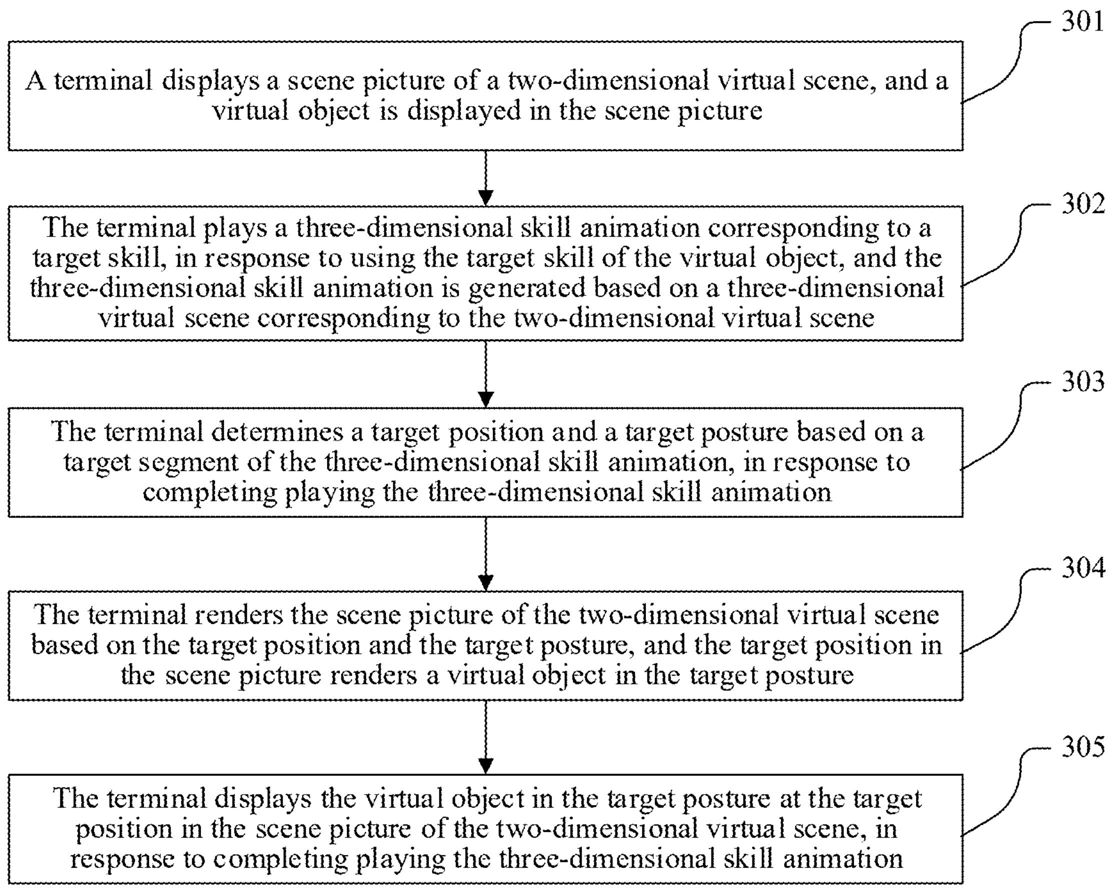
FIG. 3 is a flowchart of another display method of a scene picture according to an embodiment of this application.

FIG. 2 illustratively shows a main flow of the display method of a scene picture according to an embodiment of this application, and the display method of a scene picture is described in detail below based on an application scene. FIG. 3 is a flowchart of another display method of a scene picture according to an embodiment of this application. As shown in FIG. 3, which is described as an example performed by a terminal. The display method of a scene picture includes the following steps.

301. The terminal displays the two-dimensional scene picture of the virtual scene, and the virtual object is displayed in the scene picture.

In embodiments of this application, the terminal is the terminal 101 shown in FIG. 1, and is installed with the game program. The game program belongs to a side-scrolling action game. When the terminal is the mobile terminal such as the mobile phone or the tablet, the game program is referred to as the side-scrolling action mobile game. Taking the virtual object being the virtual object controlled by the account registered by the current terminal as an example, the virtual scene is a virtual scene of the game program, and the virtual object is displayed in the virtual scene.

Figure 4:
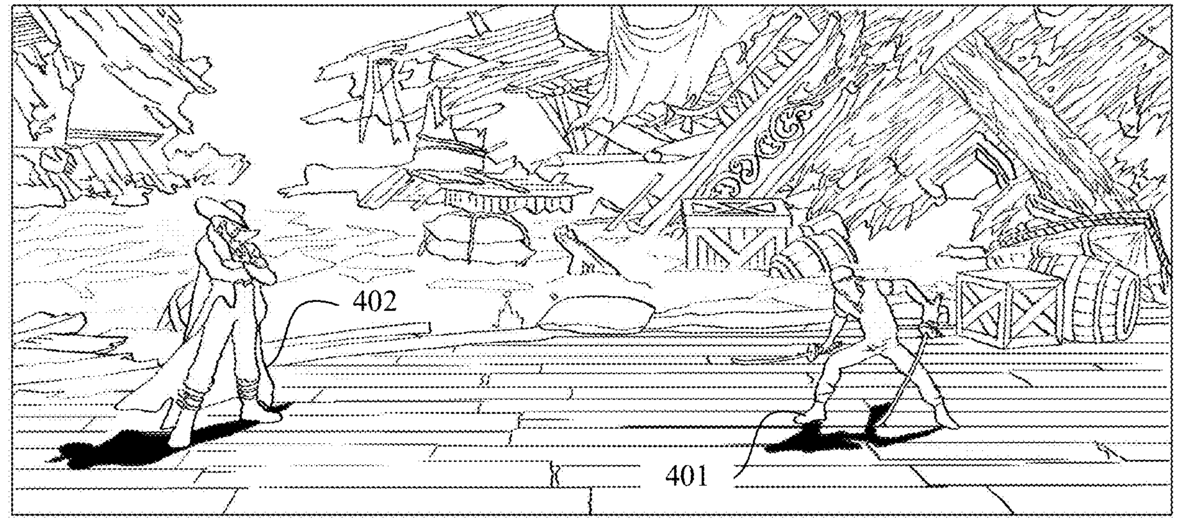
FIG. 4 is a schematic diagram of a scene picture according to an embodiment of this application.

For example, FIG. 4 is a schematic diagram of a scene picture according to an embodiment of this application. Referring to FIG. 4, the scene picture displays a virtual object 401, a virtual object 402, and the virtual background of the scene picture. The virtual object 401 is the virtual object controlled by the account registered by the current terminal, and the virtual object 402 is the NPC.

It should be noted that, in the two-dimensional scene picture of the virtual scene, the perspective method is usually used to present the spatial relationship of the virtual object in the two-dimensional virtual scene. When the virtual object is in different positions, sizes and perspective angles presented by the virtual object are different due to the perspective. The perspective angle is used for indicating an angle at which the virtual object is photographed. For example, when the virtual object translates in the virtual scene, the size and the perspective angle presented by the virtual object will change so that the virtual objects before and after the translation cannot coincide, resulting in inconsistent impressions presented to the user and a poor display effect.

Figure 5:
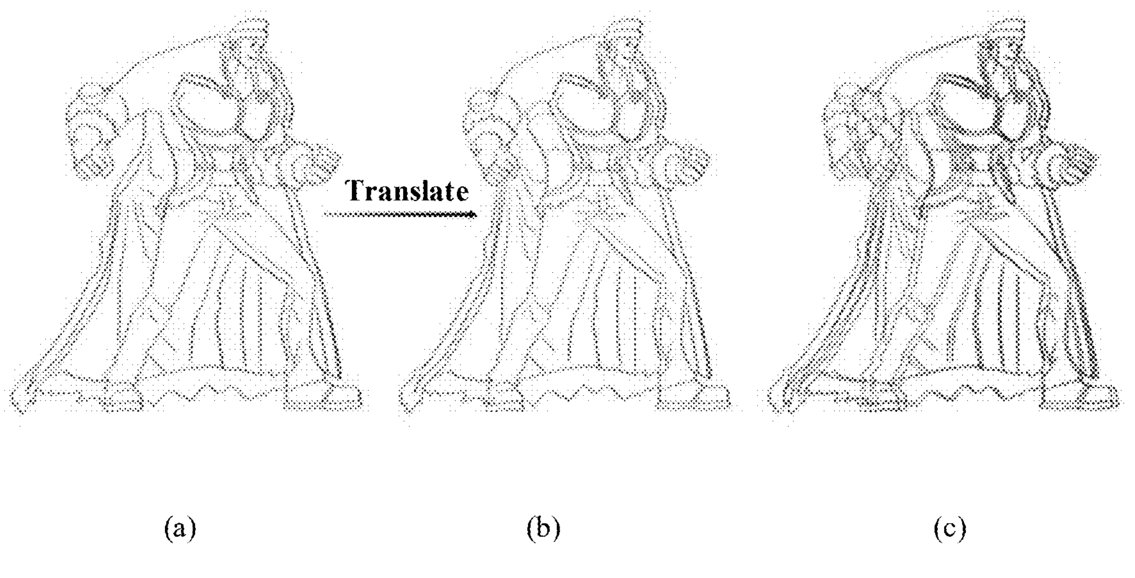
FIG. 5 is a schematic diagram of the effect of translating a virtual object before and after using a perspective according to an embodiment of this application.

For example, FIG. 5 is a schematic diagram of the effect of translating a virtual object before and after using a perspective according to an embodiment of this application. Referring to FIG. 5, when the virtual object translates from left to right in the virtual scene, it moves from the position shown in FIG. 5(*a*) to the position shown in FIG. 5(*b*). Since a position of the two-dimensional lens is unchanged, the size and the perspective angle presented by the virtual object in the scene picture photographed by the two-dimensional lens change as follows: from a larger body presenting the front of the virtual object, to a smaller body presenting the side of the virtual object, to a larger body presenting the back of the virtual object, the size and the perspective angle of the virtual object before and after the translation are inconsistent. Referring to (c) in FIG. 5, which exemplarily shows the case where a position of the virtual object in FIG. 5(*a*) and a position of the virtual object in FIG. 5(*b*) are superimposed, it is apparent that the sizes and the perspective angles presented by the virtual object are not consistent.

In some embodiments, to improve the display effect, perspective-based effects on the virtual object can be removed by performing the perspective correction on the virtual object in the two-dimensional scene picture. The perspective correction is used for indicating that the size and the perspective angle of the virtual object will not change when the virtual object translates in the two-dimensional scene picture. By performing the perspective correction on the virtual object in the two-dimensional scene picture, the sizes and the perspective angles of the virtual object are consistent before and after the translation, and the display effect of the virtual object can be improved.

Figure 6:
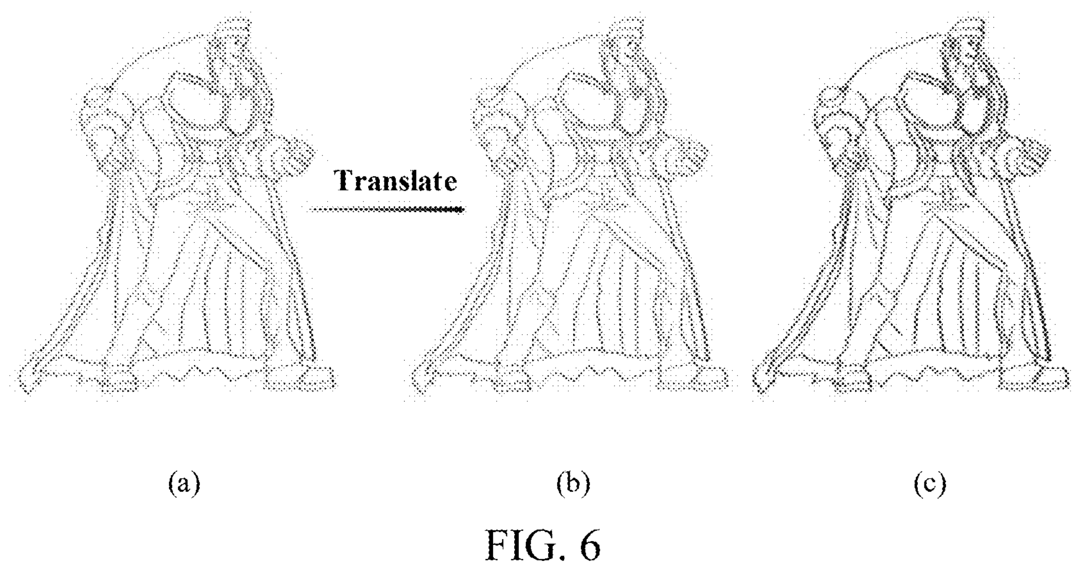
FIG. 6 is a schematic diagram of the effect of translating a virtual object before and after using a perspective correction according to an embodiment of this application.

For example, FIG. 6 is a schematic diagram of the effect of translating a virtual object before and after using a perspective correction according to an embodiment of this application. Referring to FIG. 6, when the virtual object translates from left to right in the two-dimensional scene picture, it moves from the position shown in FIG. 6(*a*) to the position shown in FIG. 6(*b*). Due to the use of perspective correction technology, the size and the perspective angle of the virtual object presented in the scene picture photographed by the two-dimensional lens are unchanged. Referring to (c) in FIG. 6, which exemplarily shows the case where a position of the virtual object in FIG. 6(*a*) and a position of the virtual object in FIG. 6(*b*) are superimposed, it is apparent that the sizes and the perspective angles presented by the virtual object are consistent.

302. The terminal plays a three-dimensional skill animation corresponding to a target skill, in response to using the target skill of the virtual object, and the three-dimensional skill animation is generated based on a three-dimensional virtual scene corresponding to the two-dimensional scene picture.

In embodiments of this application, the target skill is the hidden skill possessed by the virtual object, or the ordinary skill possessed by the virtual object. Each target skill corresponds to one three-dimensional skill animation for presenting the skill action of the target skill performed by the virtual object. The corresponding relationship between the three-dimensional virtual scene and the two-dimensional scene picture is described in step 202, and will not be described in detail herein.

In some embodiments, the three-dimensional skill animation is generated by the terminal based on the three-dimensional virtual scene, or generated by the server based on an animation acquisition request uploaded by the terminal. The animation acquisition request includes a position of the virtual object in the two-dimensional scene picture of the virtual scene. The terminal can obtain the three-dimensional skill animation from the server. Embodiments of this application take the three-dimensional skill animation being generated by the terminal as an example to describe. The terminal photographs the skill action of the target skill performed by the virtual object in the three-dimensional virtual scene, in response to using the target skill of the virtual object, to obtain the three-dimensional skill animation corresponding to the target skill. Then, the terminal plays the three-dimensional skill animation. Different target skills correspond to different three-dimensional skill animations. By photographing the three-dimensional skill animation in the three-dimensional virtual scene, the three-dimensional skill animation can present the skill action of the target skill performed by the virtual object from multiple angles and three-dimensionally, resulting in a good display effect. In addition, since the three-dimensional virtual scene corresponds to the two-dimensional scene picture, the three-dimensional skill animation obtained by photographing is closely associated with the two-dimensional scene picture, thereby improving the user experience.

In some embodiments, the terminal can photograph the three-dimensional skill animation based on the corresponding relationship between the three-dimensional virtual scene and the two-dimensional scene picture. The step, the terminal photographs the skill action of the target skill performed by the virtual object in the three-dimensional virtual scene, in response to using the target skill of the virtual object, to obtain the three-dimensional skill animation corresponding to the target skill, is implemented based on the following step (1) to step (3).

(1) The terminal determines a second position of the virtual object in the three-dimensional virtual scene according to a first position of the virtual object in the two-dimensional scene picture, in response to using the target skill of the virtual object.

The terminal can acquire the first position of the virtual object in the two-dimensional scene picture. Since there is a corresponding relationship between the three-dimensional virtual scene and the two-dimensional scene picture, the terminal can determine the second position of the virtual object in the three-dimensional virtual scene according to the corresponding relationship and the first position. That is, the terminal can determine the second position of the virtual object in the three-dimensional virtual scene based on the first position and the corresponding relationship according to the first position of the virtual object in the two-dimensional scene picture. The first position and the second position are three-dimensional coordinates.

(2) The terminal determines photographing parameter information according to the second position and an action trajectory of the skill action, the photographing parameter information including a photographing start position, a photographing end position, and a photographing trajectory in the three-dimensional virtual scene.

The skill action of the target skill of the virtual object is a preset action. The terminal can acquire the action trajectory of the skill action based on a skill mark of the target skill. The terminal can determine photographing parameters such as the photographing start position, the photographing end position, and the photographing trajectory according to the action trajectory. The photographing parameters can also include parameters such as a lens moving speed and a lens focal length. The terminal can photograph the three-dimensional skill animation in the three-dimensional virtual scene based on the 3D lens. The photographing start position is a position where the 3D lens starts photographing the three-dimensional skill animation in the three-dimensional virtual scene. The photographing end position is a position where the 3D lens finishes photographing the three-dimensional skill animation in the three-dimensional virtual scene. The 3D lens can move from the photographing start position to the photographing end position along the photographing trajectory.

(3) The terminal photographs the skill action of the target skill performed by the virtual object in the three-dimensional virtual scene according to the photographing parameter information to obtain the three-dimensional skill animation.

The terminal controls the 3D lens to start photographing from the photographing start position when the virtual object starts performing the skill action of the target skill. In the process of the virtual object performing the skill action, the terminal controls the 3D lens to move along the photographing trajectory to the photographing end position, that is, the terminal controls the 3D lens to continuously photograph the skill action of the target skill performed by the virtual object to obtain the three-dimensional skill animation corresponding to the target skill. The virtual object performs an action from the second position in the three-dimensional virtual scene and finally reaches an action end position. The action end position is the same as the second position or may be different from the second position, and is not limited thereto.

For example, the photographing start position of the 3D lens is located directly in front of the virtual object. The virtual object sprints forward from the second position for three seconds while performing the skill action, at which time the 3D lens photographs at the photographing start position for three seconds. And then, the virtual object moves back to the second position. During the retreat of the virtual object, the 3D lens moves from the photographing start position along the photographing trajectory, and when the virtual object retreats to the second position, the 3D lens moves to the photographing end position. The photographing end position is located directly to the left of the virtual object, and the 3D lens continuously photographs the virtual object while moving.

It should be noted that, the virtual object in the three-dimensional skill animation is displayed in perspective way, that is, when the virtual object is close to the 3D lens, the virtual object is presented large. When the virtual object is far from the 3D lens, the virtual object presented is small. When the 3D lens is directly in front of the virtual object, the perspective angle of the virtual object is directly in front, and at this time, the front of the virtual object is presented, that is, two sides and the back of the virtual object cannot be seen. When the 3D lens is directly on the left of the virtual object, the perspective angle of the virtual object is directly on the left, and at this time, the left of the virtual object is presented, that is, a part of the front of the virtual object can be seen, and the right and back of the virtual object cannot be seen. Since the virtual object in the scene picture is processed using the perspective correction technology, the size and the perspective angle of the virtual object in the two-dimensional scene picture of the virtual scene are different from the size and the perspective angle of the virtual object in the three-dimensional skill animation. If the two-dimensional scene picture of the virtual scene is switched directly from the three-dimensional skill animation after completing playing the three-dimensional skill animation, a perspective change will occur at this time, resulting in abrupt picture switching. Therefore, it is necessary to determine the target position and the target posture of the virtual object in the two-dimensional scene picture of the virtual scene according to the target segment in the three-dimensional skill animation, and the terminal performs step 303 to step 305.

303. The terminal determines the target position and the target posture based on the target segment of the three-dimensional skill animation, in response to completing playing the three-dimensional skill animation.

In embodiments of this application, the target segment may be the last frame of the three-dimensional skill animation, may be the penultimate frame of the three-dimensional skill animation, or may be a plurality of image frames in the three-dimensional skill animation, and embodiments of this application do not limit this.

In some embodiments, the target segment is the last frame of the three-dimensional skill animation. The step, the terminal determines the target position and the target posture based on the target segment of the three-dimensional skill animation, includes the following. The terminal determines a third position and a first posture of the virtual object in the three-dimensional virtual scene based on the target segment of the three-dimensional skill animation. The terminal stores the position and the posture of the virtual object in each frame of the three-dimensional skill animation, and the terminal can directly acquire the third position and the first posture of the virtual object in the three-dimensional virtual scene when photographing the last frame. Alternatively, the terminal can perform an image recognition on the last frame of the three-dimensional skill animation to obtain the third position and the first posture of the virtual object in the three-dimensional virtual scene, and embodiments of this application do not limit this. Then, the terminal determines the target position and the target posture of the virtual object in the two-dimensional scene picture based on the acquired third position and the first posture. The terminal determines the target position and the target posture of the virtual object in the two-dimensional scene picture based on the third position and the first posture of the virtual object in the last frame of the three-dimensional skill animation so that the target position and the target posture can be consistent with the third position and the first posture, respectively, thereby improving the smoothness when the three-dimensional skill animation switches to the two-dimensional scene picture of the virtual scene.

Figure 7:
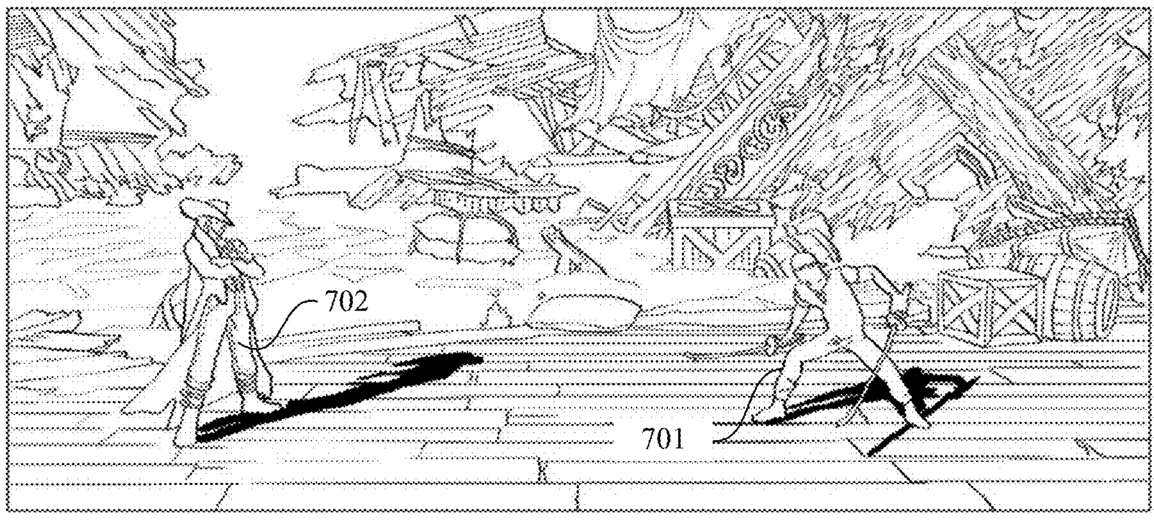
FIG. 7 is a schematic diagram of a target segment of a three-dimensional skill animation according to an embodiment of this application.

For example, FIG. 7 is a schematic diagram of a target segment of a three-dimensional skill animation according to an embodiment of this application. Referring to FIG. 7, the target segment is the last frame of the three-dimensional skill animation, and the last frame of the three-dimensional skill animation displays a virtual object 701, a virtual object 702, and a virtual background. The virtual object 701 is a virtual object controlled by the account registered by the terminal, and the virtual object 702 is the NPC. A position where the virtual object 701 is located is the third position, and a current posture of the virtual object 701 is the first posture.

In some embodiments, when the target segment is the penultimate frame of the three-dimensional skill animation, the step, the terminal determines the target position and the target posture based on the target segment of the three-dimensional skill animation, is similar to the step when the target segment is the last frame. The difference is that after determining the third position and the first posture of the virtual object in the three-dimensional virtual scene based on the target segment, the terminal predicts the position and the posture of the virtual object in the two-dimensional scene picture based on the third position and the first posture to obtain the target position and the target posture. The prediction is performed based on the penultimate frame of the three-dimensional skill animation so that the predicted target position and target posture conform to a movement trend of the virtual object, thereby improving the smoothness when the three-dimensional skill animation switches to the two-dimensional scene picture of the virtual scene.

In some embodiments, when the target segment is the plurality of image frames in the three-dimensional skill animation, the terminal can predict based on a change trend of the position and the posture of the virtual object in the plurality of image frames to obtain the target position and the target posture of the virtual object in the two-dimensional scene picture. The prediction is performed based on the plurality of image frames in the three-dimensional skill animation so that the predicted target position and target posture conform to the movement trend of the virtual object, thereby improving the smoothness when the three-dimensional skill animation switches to the two-dimensional scene picture of the virtual scene.

304. The terminal renders the two-dimensional scene picture of the virtual scene based on the target position and the target posture, and the target position in the scene picture renders the virtual object in the target posture.

In embodiments of this application, after acquiring the target position and the target posture of the virtual object in the two-dimensional scene picture, the terminal renders an object model of the virtual object and the virtual background of the two-dimensional scene picture to obtain the two-dimensional scene picture of the virtual scene.

In some embodiments, the terminal can translate the object model to the target position in the two-dimensional scene picture based on the target position. Then, the terminal rotates and scales the object model so that the object model presents the target posture. Later, the terminal photographs based on the two-dimensional lens in the two-dimensional scene picture to obtain a scene picture to be rendered. Finally, the terminal renders the scene picture. By translating, rotating, and scaling the object model of the virtual object, the virtual object can be presented in the target posture at the target position in the scene picture, and the rendering efficiency of the scene picture is improved.

Figure 8:
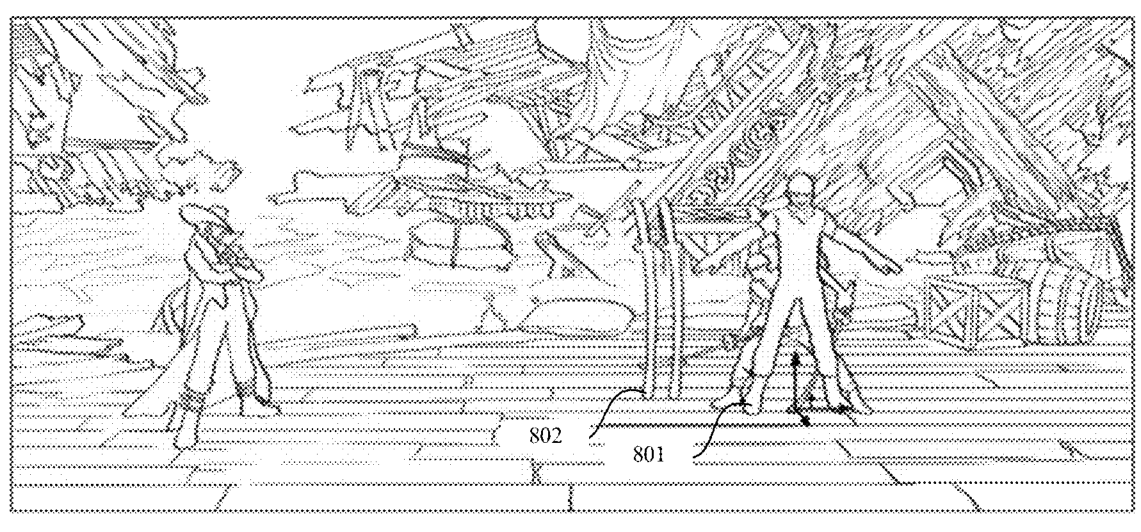
FIG. 8 is a schematic diagram of adjusting an object model according to an embodiment of this application.

It should be noted that, since the translating, rotating, and scaling of the object model by the terminal is a background process, for ease of understanding, the above-mentioned background process is described in a visual way below. FIG. 8 is a schematic diagram of adjusting an object model according to an embodiment of this application. Referring to FIG. 8, the terminal translates an object model 801 of the virtual object so that the object model moves to the target position in the two-dimensional scene picture. The terminal changes a position of the object model in the two-dimensional scene picture by adjusting position parameters in an object transformation interface shown in FIG. 8, that is, adjusting coordinate values of the object model in an X direction, a Y direction, and a Z direction. The X direction points horizontally to the right, the Y direction points horizontally to a direction of the two-dimensional lens, and the Z direction points vertically upwards, which are not limited herein. The terminal rotates and scales the object model 801 of the virtual object so that the object model presents the target posture. The terminal changes the posture of the virtual object by adjusting rotation parameters and scaling parameters in the object transformation interface shown in FIG. 8, that is, adjusting rotation angles and scaling ratios of the object model in the X direction, the Y direction, and the Z direction.

In some embodiments, the object model of the virtual object does not include a virtual prop possessed by the virtual object, such as a virtual sword shown in FIG. 8. According to a position and a form of the virtual prop in the target segment of the three-dimensional skill animation, the terminal can translate, rotate, and scale the virtual prop so that the position and the form of the virtual prop in the two-dimensional scene picture of the virtual scene are consistent with those in the target segment. How the terminal adjusts the virtual prop is similar to how the terminal adjusts the object model, and will not be described in detail herein. By adjusting the position of the virtual prop, the scene picture is more consistent with the content displayed in the target segment of the three-dimensional skill animation, and thus when the three-dimensional skill animation switches to the two-dimensional scene picture of the virtual scene, the virtual scene picture connection is smooth and the display effect is better.

For example, with continued reference to FIG. 8, the terminal can translate, rotate, and scale a virtual prop 802, and the processing way refers to the way that the terminal processes the object model 801, and will not be described in detail herein.

In some embodiments, the terminal can also supersede the above-mentioned position and posture adjustment steps with model replacement. The terminal can acquire a first model of the virtual object in the three-dimensional virtual scene, and generate a second model based on a corresponding posture of the first model in the target segment. The posture of the second model is the target posture. The second model is adjusted based on the first model, that is, three-dimensional features in the first model are adjusted into two-dimensional features, such as a foot of the object model is changed from forefoot landing to whole foot landing and a first of the object model is changed from pointing to the upper right to pointing to the right upper. Then, in the process of rendering the two-dimensional scene picture of the virtual scene, the terminal directly replaces an original model with the second model so that the second model presents in the target posture at the target position in the scene picture. By directly replacing the model of the virtual object, the scene picture can be rendered efficiently.

It should be noted that, since the perspective correction is performed on the virtual object in the two-dimensional scene picture, the object model of the virtual object is not completely consistent in the three-dimensional virtual scene and in the two-dimensional scene picture, that is, there may be some errors in determining the target position and the target posture based on the target segment in the three-dimensional virtual scene.

Figure 9:
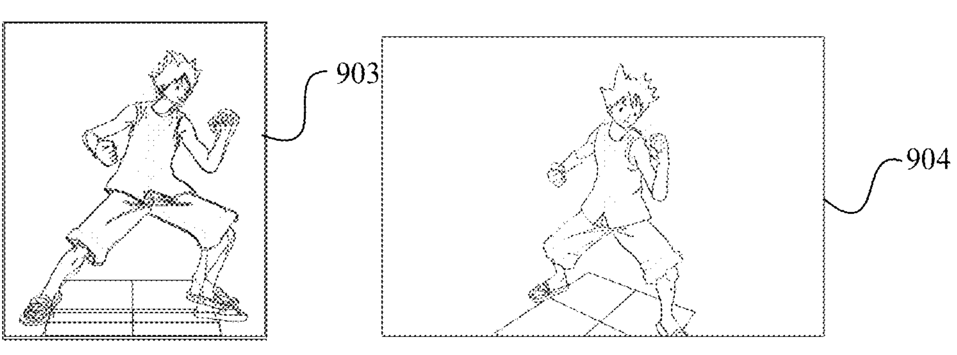
FIG. 9 is a schematic diagram of an object model of a virtual object according to an embodiment of this application.

For example, FIG. 9 is a schematic diagram of an object model of a virtual object according to an embodiment of this application. Referring to FIG. 9, 901 is an object model in the three-dimensional virtual scene, 902 is an object model in the two-dimensional scene picture, and 903 represents a comparative schematic diagram after the superposition of 901 and 902. It can be seen from 903 that the object model of the virtual object in the three-dimensional virtual scene is not completely consistent with the model of the virtual object in the two-dimensional scene picture.

If the model is switched directly in a static scene picture, the change presented by the virtual object will be obvious, resulting in a poor picture connection. To this end, the terminal masks the replacement of the model in combination with the rotation of the lens. That is, when the terminal photographs the three-dimensional skill animation, the 3D lens rotates continuously, and when switching the three-dimensional skill animation to the scene picture, the last frame of the three-dimensional skill animation is replaced with the two-dimensional scene picture of the virtual scene, and the model is replaced in the switching process. Since the lens is moving all the time, no abrupt change will occur if the model is switched at this time so that the picture connection is smooth and the model switching is not obvious.

For example, with continued reference to FIG. 9, 904 is an object model in one of the frames of the three-dimensional skill animation. By rotating the lens when photographing the three-dimensional skill animation, the posture presented by the object model is gradually converted from 904 to 901, that is, from the front to the side of the virtual object, and the model is replaced when the rotation is about to end, that is, the model shown at 901 is replaced with the object model shown at 902. Because the virtual objects of the two models are basically identical, the picture connection is smooth, the replacement of the model is not easy to be perceived, and the display effect is good.

In some embodiments, the terminal can also adjust the virtual background of the two-dimensional scene picture of the virtual scene based on the virtual background in the target segment so that the virtual backgrounds are consistent. The terminal can determine a first virtual background based on the target segment. The first virtual background is used for indicating pictures other than the virtual object in the target segment. Then, the terminal aligns a second virtual background in the two-dimensional scene picture of the virtual scene with the first virtual background, and displays the aligned second virtual background in the two-dimensional scene picture of the virtual scene. The second virtual background is used for indicating pictures other than the virtual object in the scene picture. By adjusting the virtual background of the second scene picture, the scene picture is more consistent with the target segment, so when switching from the three-dimensional skill animation to the scene picture, the background part does not appear abrupt, and the picture connection is smoother, and the display effect is better.

Figure 10:
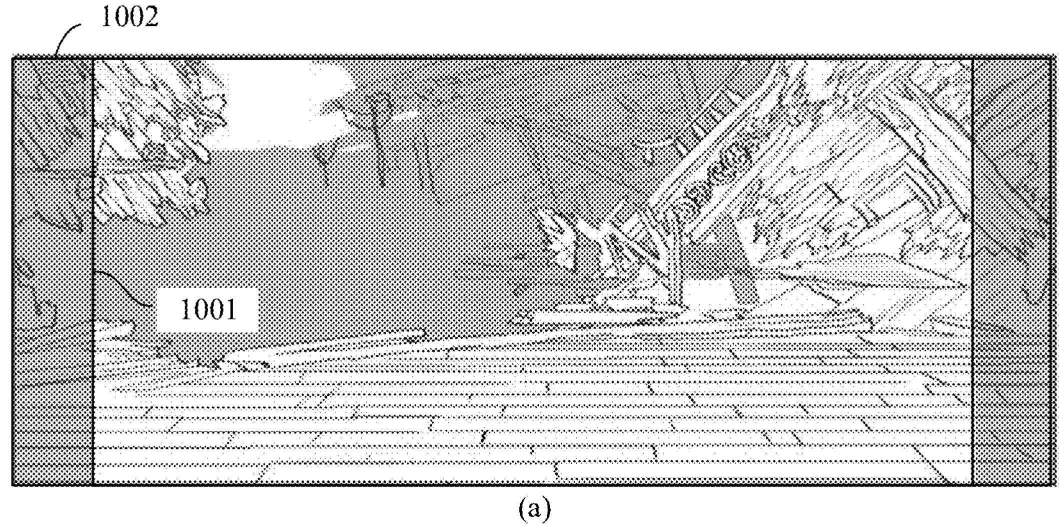
FIG. 10 is a schematic diagram of adjusting a virtual background according to an embodiment of the present invention.
Figure 10:
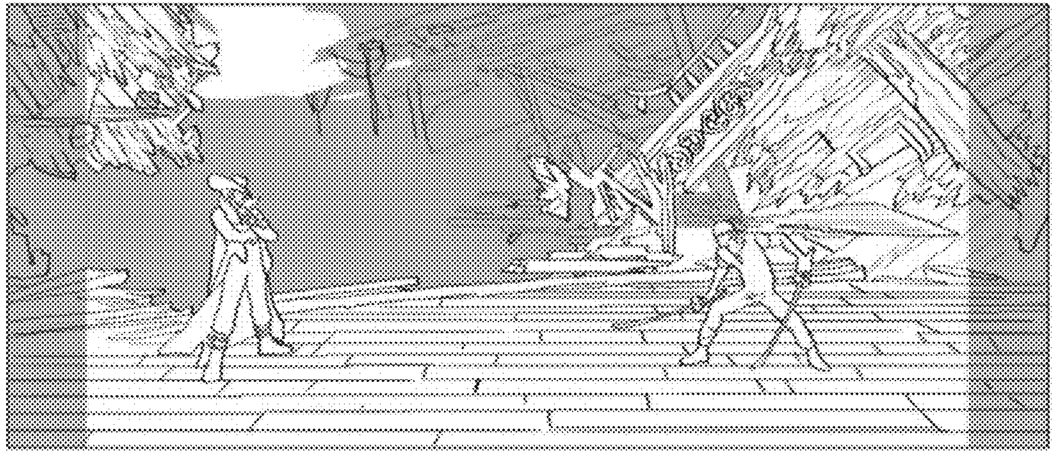

For example, FIG. 10 is a schematic diagram of adjusting a virtual background according to an embodiment of the present invention. Referring to FIG. 10, 1001 shown in (a) of FIG. 10 is a display range corresponding to the second virtual background of the scene picture. 1002 shown in (a) of FIG. 10 is a display range corresponding to the second virtual background of the target segment. The shaded part represents a display range in which the first virtual background is more than the second virtual background. By aligning the first virtual background with the second virtual background, the content displayed by the second virtual background is adjusted so that the content displayed by the second virtual background is consistent with the first virtual background. As shown in FIG. (b), the two-dimensional scene picture of the virtual scene can be rendered based on the replaced object model and the aligned virtual background.

It should be noted that, the terminal can implement this step based on three-dimensional software already deployed in a game engine. Embodiments of this application do not limit the kinds of game engines and three-dimensional software.

305. The terminal displays the virtual object in the target posture at the target position in the two-dimensional scene picture of the virtual scene, in response to completing playing the three-dimensional skill animation.

In embodiments of this application, the two-dimensional scene picture of the virtual scene is switched from the last frame of the three-dimensional skill animation, in response to completing playing the three-dimensional skill animation, and the virtual object is displayed in the target posture at the target position in the scene picture. The target posture presented by the virtual object in the two-dimensional scene picture of the virtual scene is consistent with the posture of the virtual object when completing playing the three-dimensional skill animation, and the position presented by the virtual object is consistent with the position of the virtual object when completing playing the three-dimensional skill animation, thereby connecting smoothly when the three-dimensional skill animation switches to the two-dimensional scene picture of the virtual scene, improving the smoothness of the picture connection and improving the display effect.

Figure 11:
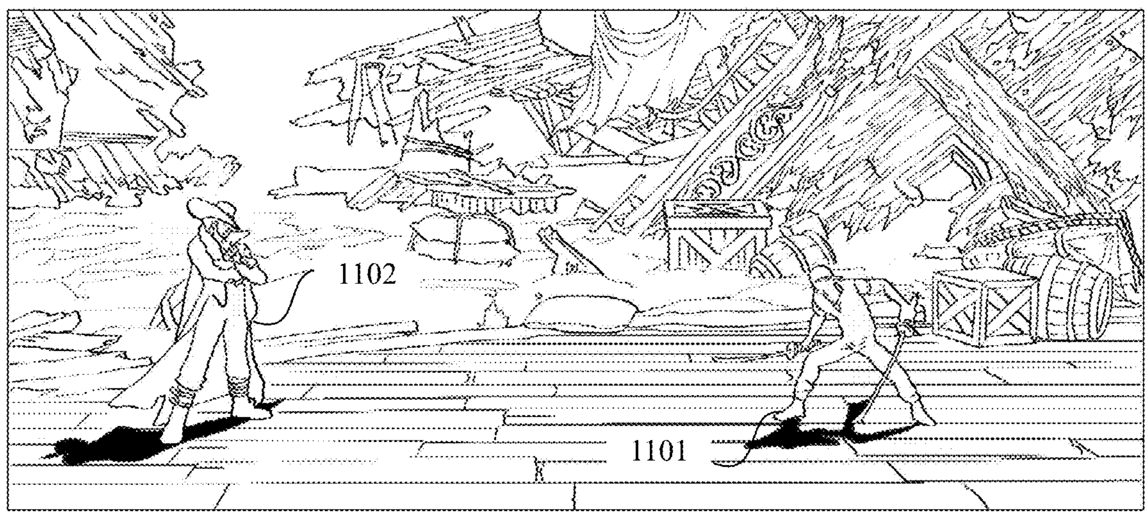
FIG. 11 is a schematic diagram of another scene picture according to an embodiment of this application.

For example, FIG. 11 is a schematic diagram of another scene picture according to an embodiment of this application. Referring to FIG. 11, the scene picture displays a virtual object 1101, a virtual object 1002, and a virtual background. The virtual background of the scene picture corresponds to the virtual background of the target segment. A position where the virtual object 1101 is located is the target position, and a current posture of the virtual object 1101 is the target posture. The virtual object 1002 is the NPC.

In some embodiments, the terminal can use a trend connection method to connect the three-dimensional skill animation and the two-dimensional scene picture of the virtual scene. The terminal displays the virtual object in the target posture at the target position in the two-dimensional scene picture of the virtual scene, in response to completing playing the penultimate frame of the three-dimensional skill animation. Since the scene picture is consistent with the content of the last frame of the three-dimensional skill animation, switching directly from the penultimate frame of the three-dimensional skill animation to the scene picture will not be abrupt.

Figure 12:
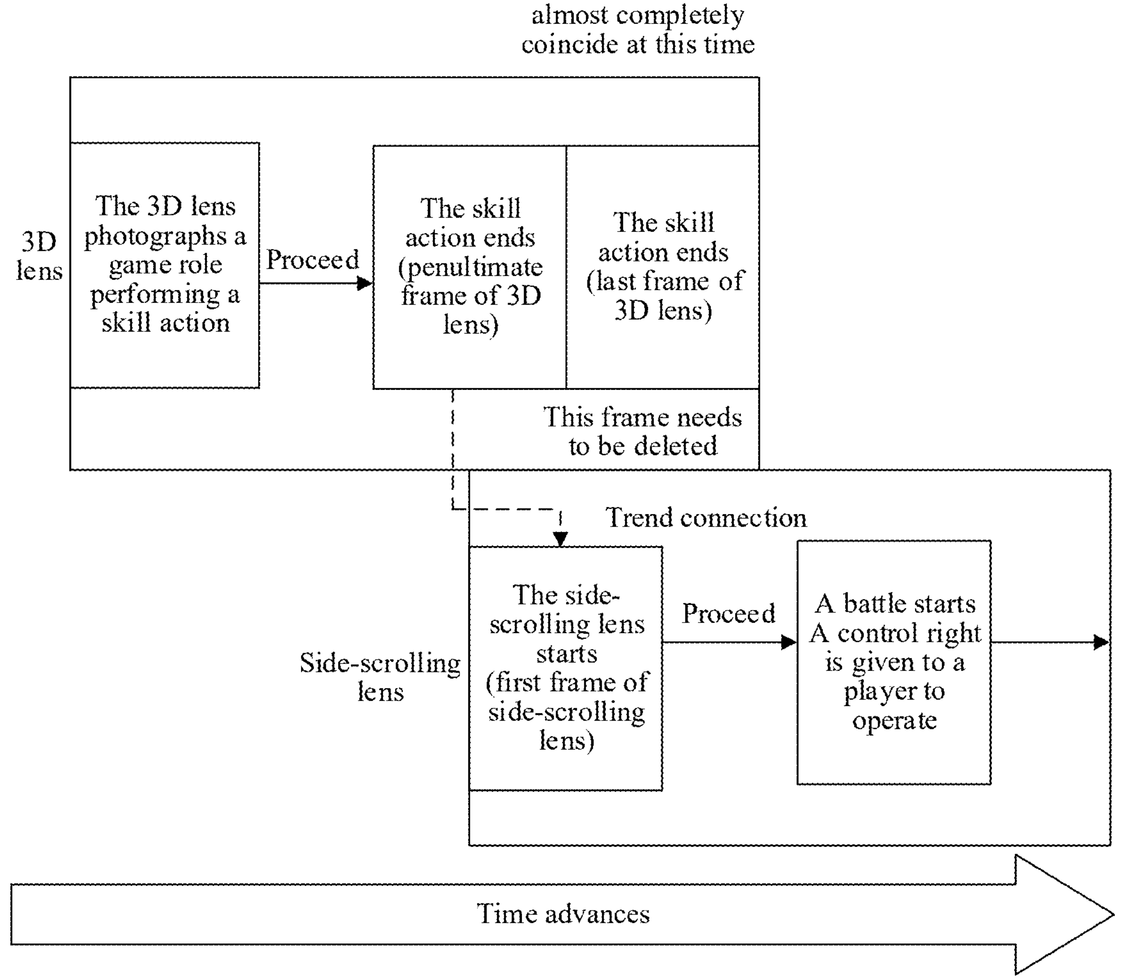
FIG. 12 is a schematic diagram of a trend connection according to an embodiment of this application.

For example, FIG. 12 is a schematic diagram of a trend connection according to an embodiment of this application. Referring to FIG. 12, the terminal photographs the game role performing the skill action through the 3D lens to obtain the three-dimensional skill animation. Then the three-dimensional skill animation is played, and after completing playing the last second frame of the three-dimensional skill animation, the first frame of the side-scrolling lens, that is, the two-dimensional scene picture of the virtual scene, is directly displayed and then enters a battle flow, and a control right of the game role is given to the player, and the player controls the game role.

Figure 13:
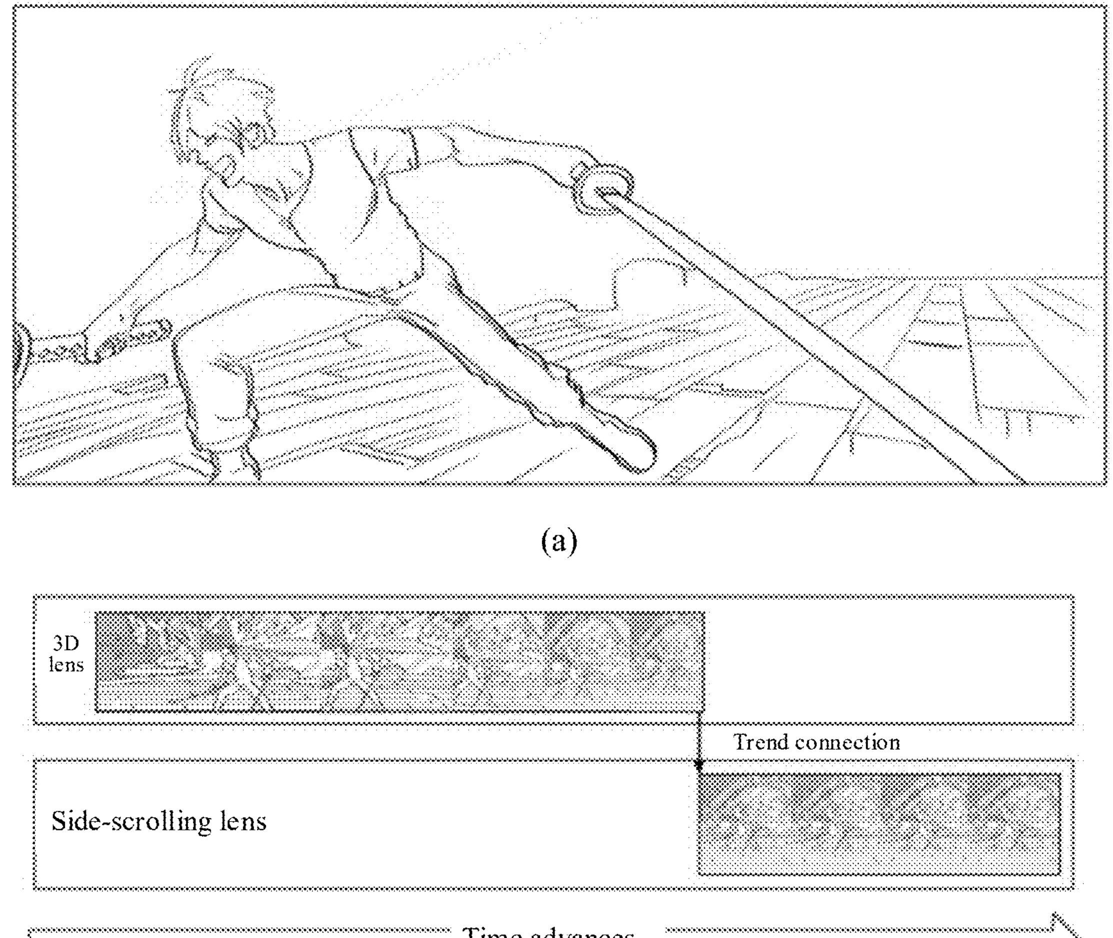
FIG. 13 is a schematic diagram of another trend connection according to an embodiment of this application.

It should be noted that, to make the solutions provided by embodiments of this application easier to understand, FIG. 13 is a schematic diagram of another trend connection according to an embodiment of this application. Referring to FIG. 13, (a) in FIG. 13 is a virtual object in a middle frame of the three-dimensional skill animation, and the 3D lens is located directly in front of the virtual object. The terminal combines the lens rotation method and the trend connection method. An upper part of (b) in FIG. 13 shows that the 3D lens starts to rotate and move from the right front of the virtual object, and moves away from the virtual object, that is, using a one-take conversion method to change the photographing angle of the 3D lens to photograph the virtual object. Thus, as time advances, when the penultimate frame of the three-dimensional skill animation is played, the trend connection is adopted to replace the last frame of the three-dimensional skill animation with the two-dimensional scene picture of the virtual scene. By combining the lens rotation and the trend connection to switch the picture, the picture connection can be smooth and the display effect is good.

It should be noted that, the side-scrolling action mobile game further includes the three-dimensional scenario animation, and the terminal can also switch from the three-dimensional scenario animation to the two-dimensional scene picture of the virtual scene. The terminal plays the three-dimensional scenario animation in response to triggering the three-dimensional scenario animation. The three-dimensional scenario animation displays the virtual object, and the three-dimensional scenario animation is generated based on the three-dimensional virtual scene. The three-dimensional scenario animation is generated in a way similar to that of the three-dimensional skill animation, and will not be described in detail herein. The terminal displays the virtual object in a second posture at a fourth position in the two-dimensional scene picture of the virtual scene, in response to completing playing the three-dimensional scenario animation. The fourth position and the second posture are determined based on the target segment of the three-dimensional scenario animation. The process of switching the three-dimensional scenario animation to the two-dimensional scene picture of the virtual scene by the terminal is the same as the above-mentioned process of switching the three-dimensional skill animation to the two-dimensional scene picture of the virtual scene, and will not be described in detail herein.

Figure 14:
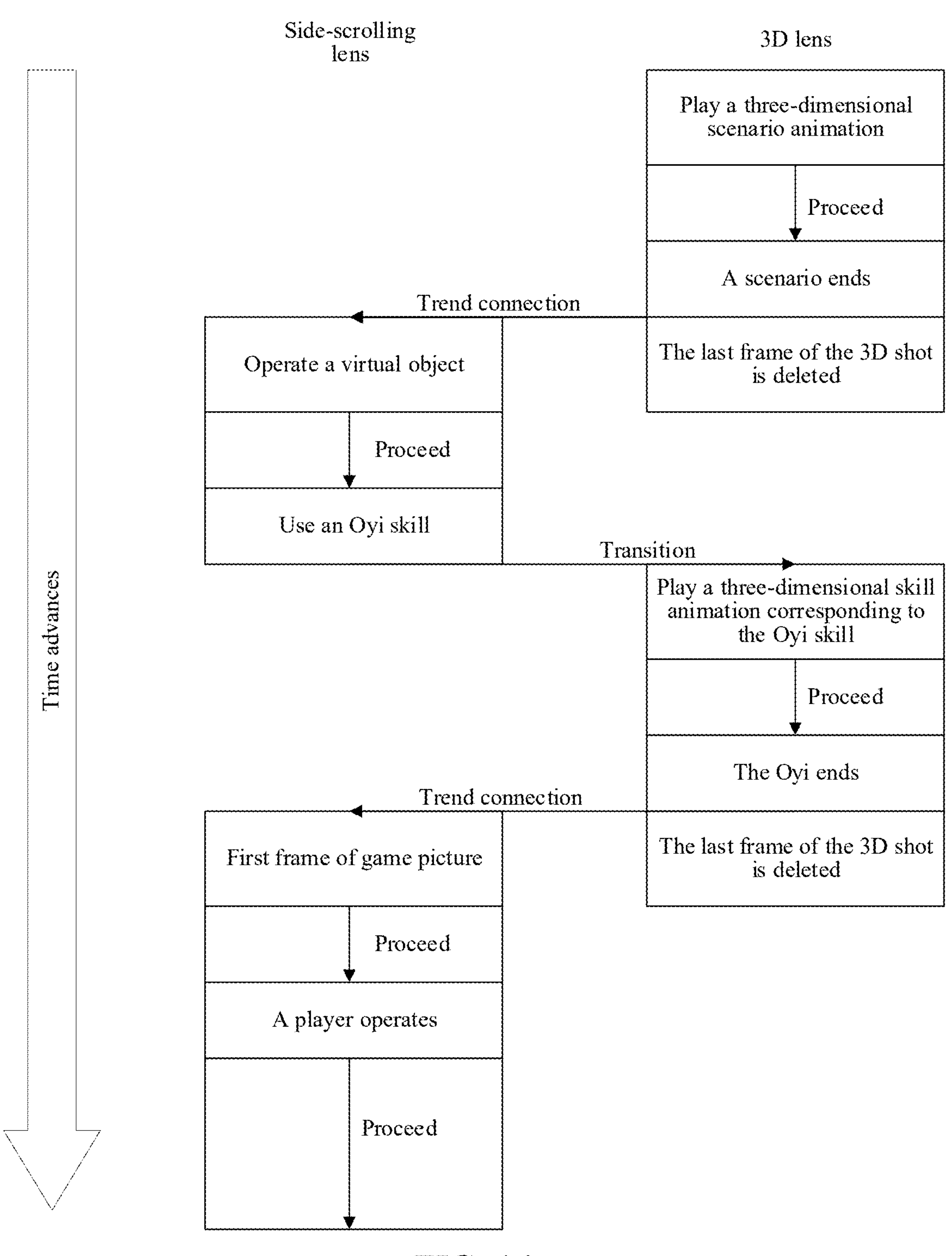
FIG. 14 is a flowchart of displaying a virtual scene picture according to an embodiment of this application.

For example, FIG. 14 is a flowchart of displaying a virtual scene picture according to an embodiment of this application. Referring to FIG. 14, as time advances, the terminal plays the three-dimensional scenario animation, and at the end of playing the penultimate frame of the three-dimensional scenario animation, the trend connection is adopted to replace the last frame of the three-dimensional scenario animation with the two-dimensional scene picture of the virtual scene. The user account manipulates the virtual object. The terminal switches the two-dimensional scene picture of the virtual scene to a three-dimensional skill animation corresponding to playing the hidden skill by means of transition, in response to releasing the hidden skill. When completing playing the penultimate frame of the three-dimensional skill animation, the trend connection is adopted to replace the last frame of the three-dimensional skill animation with the two-dimensional scene picture of the virtual scene, and so on, and the terminal displays the scene picture adopting this method.

In solutions proposed in embodiments of this application, after completing playing the three-dimensional skill animation, the target position and the target posture of the virtual object in the two-dimensional scene picture of the virtual scene are determined based on the target segment of the three-dimensional skill animation so that the position and the posture of the virtual object can be consistent with those in the target segment, thereby when switching from the three-dimensional skill animation to the two-dimensional scene picture of the virtual scene, the connection is smooth, which improves the smoothness of a picture connection and a display effect.

Figure 15:
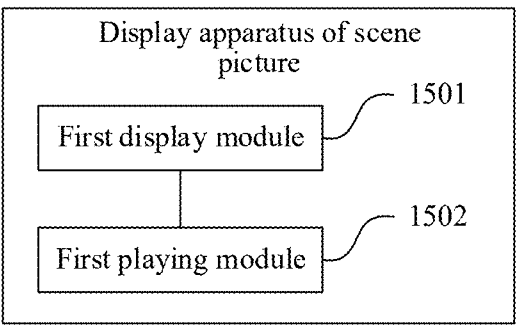
FIG. 15 is a schematic structural diagram of a display apparatus of a scene picture according to an embodiment of this application.

FIG. 15 is a schematic structural diagram of a display apparatus of a scene picture according to an embodiment of this application. Referring to FIG. 15, the apparatus includes: a first display module 1501 and a first playing module 1502.

A first display module 1501 is configured to display the two-dimensional scene picture of the virtual scene, and the virtual object is displayed in the scene picture.

A first playing module 1502 is configured to play the three-dimensional skill animation corresponding to the target skill, in response to using the target skill of the virtual object, and the three-dimensional skill animation is generated based on a three-dimensional virtual scene corresponding to the two-dimensional virtual scene.

The first display module 1501 is further configured to display the virtual object in the target posture at the target position in the two-dimensional scene picture of the virtual scene, in response to completing playing the three-dimensional skill animation, and the target position and the target posture are determined based on the target segment of the three-dimensional skill animation.

Figure 16:
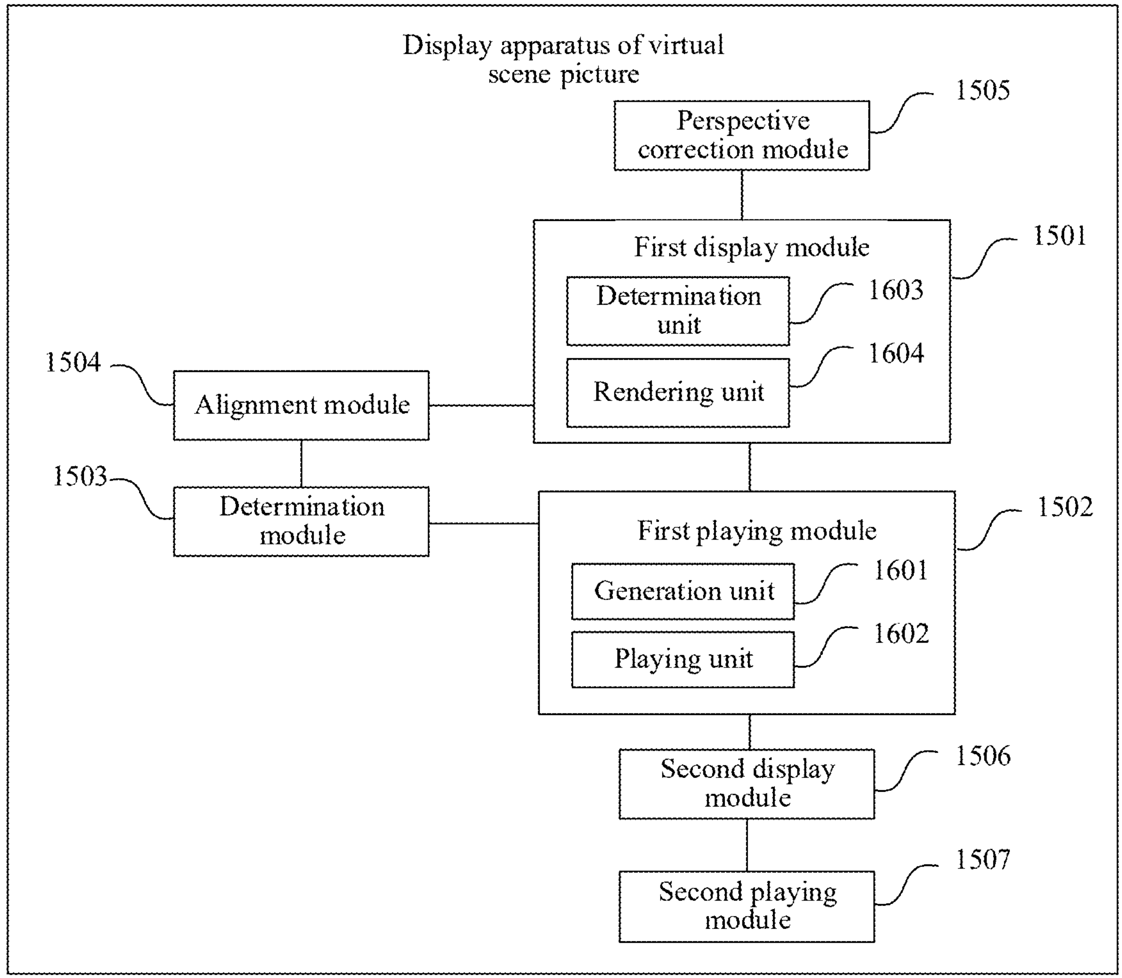
FIG. 16 is a schematic structural diagram of another display apparatus of a scene picture according to an embodiment of this application.

In some embodiments, FIG. 16 is a schematic structural diagram of another display apparatus of a scene picture according to an embodiment of this application. Referring to FIG. 16, the first playing module 1502 includes:

- a generation unit 1601, configured to photograph the skill action of the target skill performed by the virtual object in the three-dimensional virtual scene, in response to using the target skill of the virtual object, to obtain the three-dimensional skill animation corresponding to the target skill; and
- a playing unit 1602, configured to play the three-dimensional skill animation.

In some embodiments, the generation unit 1601 is configured to determine the second position of the virtual object in the three-dimensional virtual scene according to the first position of the virtual object in the two-dimensional virtual scene, in response to using the target skill of the virtual object; determine the photographing parameter information according to the second position and the action trajectory of the skill action, the photographing parameter information including the photographing start position, the photographing end position, and the photographing trajectory in the three-dimensional virtual scene; and photograph the skill action of the target skill performed by the virtual object in the three-dimensional virtual scene according to the photographing parameter information to obtain the three-dimensional skill animation.

In some embodiments, the first display module 1501 includes:

a determination unit 1603, configured to determine the target position and the target posture based on the target segment of the three-dimensional skill animation, in response to completing playing the three-dimensional skill animation; and a rendering unit 1604, configured to render the two-dimensional scene picture of the virtual scene based on the target position and the target posture, the target position in the scene picture rendering the virtual object in the target posture.

In some embodiments, the determination unit 1603 is configured to determine the third position and the first posture of the virtual object in the three-dimensional virtual scene based on the target segment of the three-dimensional skill animation; and determine the target position and the target posture of the virtual object in the two-dimensional virtual scene based on the third position and the first posture.

In some embodiments, the apparatus further includes:

a determination module 1503, configured to determine the first virtual background based on the target segment, the first virtual background being used for indicating pictures other than the virtual object in the target segment; and an alignment module 1504, configured to align the second virtual background in the two-dimensional scene picture of the virtual scene with the first virtual background, and display the aligned second virtual background in the two-dimensional scene picture of the virtual scene, the second virtual background being used for indicating pictures other than the virtual object in the scene picture.

In some embodiments, the first display module 1502 is configured to display the virtual object in the target posture at the target position in the two-dimensional scene picture of the virtual scene, in response to completing playing the penultimate frame of the three-dimensional skill animation; or display the virtual object in the target posture at the target position in the two-dimensional scene picture of the virtual scene, in response to completing playing the last frame of the three-dimensional skill animation.

In some embodiments, the apparatus further includes:

a perspective correction module 1505, configured to perform perspective correction on the virtual object displayed in the two-dimensional scene picture of the virtual scene, the perspective correction being used for indicating that the size and the perspective angle of the virtual object will not change when the virtual object translates in the two-dimensional virtual scene, and the perspective angle being used for indicating the angle at which the virtual object is photographed.

In some embodiments, the apparatus further includes:

a second playing module 1506, configured to play the three-dimensional scenario animation in response to triggering the three-dimensional scenario animation, the three-dimensional scenario animation displaying the virtual object, and the three-dimensional scenario animation being generated based on the three-dimensional virtual scene; and a second display module 1507, configured to display the virtual object in the second posture at the fourth position in the two-dimensional scene picture of the virtual scene, in response to completing playing the three-dimensional scenario animation, the fourth position and the second posture being determined based on the target segment of the three-dimensional scenario animation.

Embodiments of this application provide a display apparatus for a scene picture, where after completing playing the three-dimensional skill animation, the target position and the target posture of the virtual object in the two-dimensional scene picture of the virtual scene are determined based on the target segment of the three-dimensional skill animation so that the position and the posture of the virtual object can be consistent with those in the target segment, thereby when switching from the three-dimensional skill animation to the two-dimensional scene picture of the virtual scene, the connection is smooth, which improves the smoothness of a picture connection and a display effect.

It should be noted that, the display apparatus of a scene picture provided in the above-mentioned embodiments illustrates the division of the above-mentioned various functional modules when displaying the virtual scene picture. In practical application, the above-mentioned functions may be assigned to different functional modules according to needs, that is, dividing the internal structure of the apparatus into different functional modules to complete all or part of the functions described above. In addition, the display apparatus of a scene picture provided in the above-mentioned embodiments belongs to the same concept as the embodiment of the display method of a scene picture, and the implementation process thereof is described in detail in method embodiments, and will not be described in detail herein.

Figure 17:
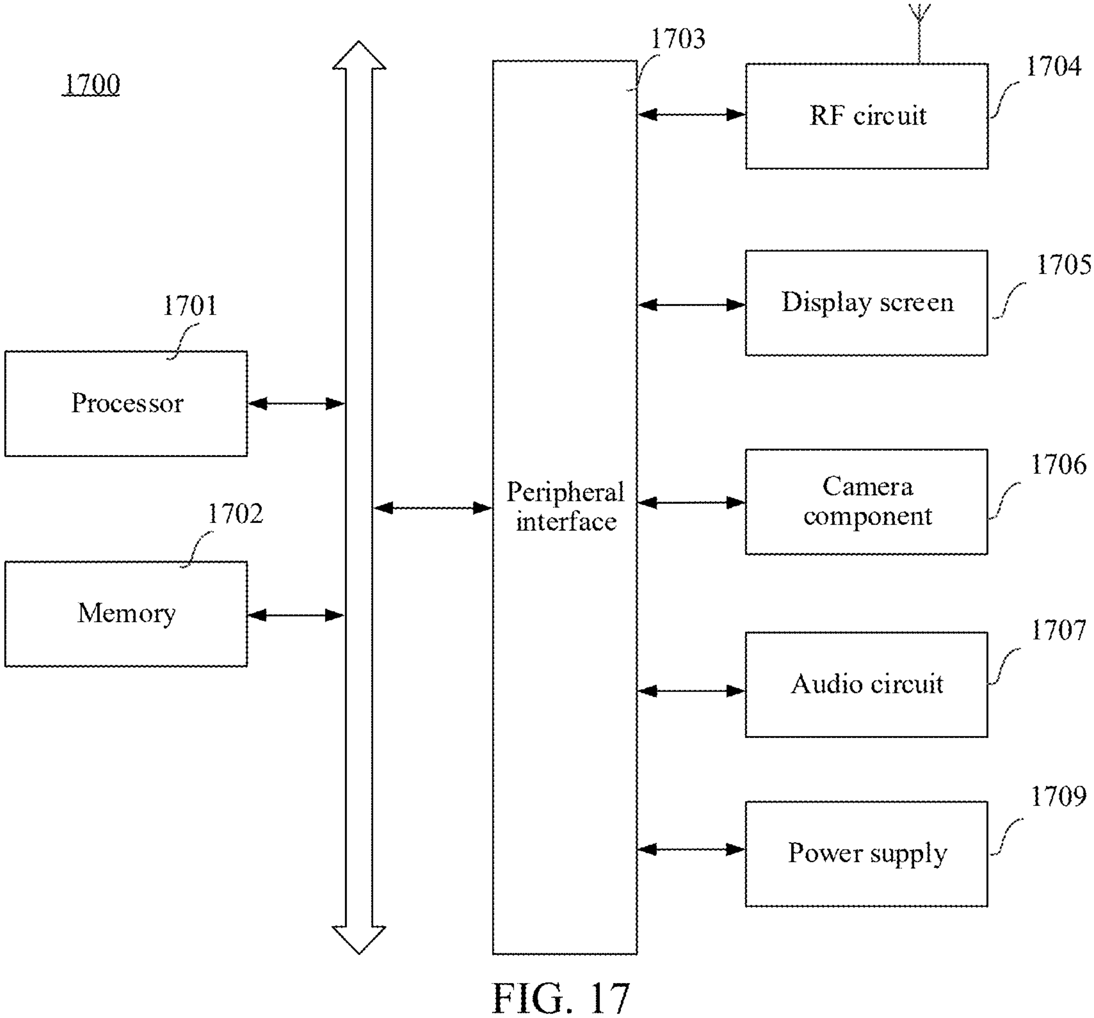
FIG. 17 is a structural block diagram of a terminal according to an embodiment of this application.

FIG. 17 is a structural block diagram of a terminal 1700 according to an embodiment of this application. The terminal 1700 may be a portable mobile terminal, such as the smartphone, the tablet compute, a moving picture experts group audio layer III (MP3) player, a moving picture experts group audio layer IV (MP4) player, the laptop computer, or the desktop computer. The terminal 1700 may also be referred to as another name such as a user equipment, a portable terminal, a laptop terminal, or a desktop terminal.

Generally, the terminal 1700 includes: a processor 1701 and a memory 1702.

The processor 1701 may include one or more processing cores, such as a 4-core processor and an 8-core processor. The processor 1701 may be implemented in at least one hardware form of a digital signal processor (DSP), a field-programmable gate array (FPGA), and a programmable logic array (PLA). The processor 1701 may also include a master processor and a coprocessor. The master processor is a processor configured to process data in a wake-up state, also referred to as a central processing unit (CPU). The coprocessor is a low-power processor configured to process data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more computer-readable storage media. The computer-readable storage medium may be non-transient. The memory 1702 may further include a high-speed random access memory and a nonvolatile memory, such as one or more disk storage devices and flash storage devices. In some embodiments, a non-transient computer-readable storage medium in the memory 1702 is used for storing at least one computer program, and the at least one computer program is used for being executed by the processor 1701 to implement the display method of a scene picture provided by method embodiments of this application.

In some embodiments, the terminal 1700 may also include: a peripheral interface 1703 and at least one peripheral. The processor 1701, the memory 1702, and the peripheral interface 1703 may be connected through a bus or a signal line. Each peripheral may be connected to the peripheral interface 1703 through the bus, the signal line, or a circuit board. The peripheral includes: at least one of a radio frequency (RF) circuit 1704, a display screen 1705, a camera component 1706, an audio circuit 1707, and a power supply 1709.

The peripheral interface 1703 may be configured to connect the at least one peripheral related to input/output (I/O) to the processor 1701 and the memory 1702. In some embodiments, the processor 1701, the memory 1702, and the peripheral interface 1703 are integrated on the same chip or circuit board. In some other embodiments, any one or two of the processor 1701, the memory 1702, and the peripheral interface 1703 may be implemented on a separate chip or circuit board, and this embodiment does not limit this.

The RF circuit 1704 is configured to receive and transmit an RF signal, also referred to as an electromagnetic signal. The RF circuit 1704 communicates with a communication network and other communication devices through the electromagnetic signal. The RF circuit 1704 converts an electric signal into the electromagnetic signal for transmission, or converts a received electromagnetic signal into the electric signal. In some embodiments, the RF circuit 1704 includes: an antenna system, an RF transceiver, one or more amplifiers, a tuner, an oscillator, a digital signal processor, a codec chipset, a subscriber identity module card, etc. The RF circuit 1704 may communicate with other terminals through at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (WiFi) network. In some embodiments, the RF circuit 1704 may further include a circuit related to near field communication (NFC), and this application does not limit this.

The display screen 1705 is configured to display a user interface (UI). The UI may include a graph, a text, an icon, a video, and any combination thereof. When the display screen 1705 is a touch display screen, the display screen 1705 further has a capability of collecting a touch signal on or above a surface of the display screen 1705. The touch signal may be inputted to the processor 1701 as a control signal for processing. In this case, the display screen 1705 may be further configured to provide a virtual button and/or a virtual keyboard, referred to as a soft button and/or a soft keyboard. In some embodiments, the display screen 1705 may be one and is arranged on a front panel of the terminal 1700. In other embodiments, the display screens 1705 may be at least two and are arranged on different surfaces of the terminal 1700 or in a folded design. In other embodiments, the display 1705 may be a flexible display screen and is arranged on a curved or folded surface of the terminal 1700. Even, the display screen 1705 may be further arranged in non-rectangular irregular graphics, that is, a special-shaped screen. The display screen 1705 may be prepared by using materials such as a liquid crystal display (LCD) and an organic light-emitting diode (OLED).

The camera component 1706 is configured to collect images or videos. In some embodiments, the camera component 1706 includes a front camera and a rear camera. Generally, the front-facing camera is disposed on the front panel of the terminal, and the rear-facing camera is disposed on a back surface of the terminal. In some embodiments, there are at least two rear cameras, which are separately any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1706 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1707 may include a microphone and a speaker. The microphone is configured to collect sound waves of a user and an environment, and convert the sound waves into the electrical signal to input to the processor 1701 for processing, or input to the RF circuit 1704 for implementing voice communication. For the purpose of stereo collection or noise reduction, there may be a plurality of microphones, provided at different portions of the terminal 1700. The microphone may further be an array microphone or an omni-directional collection microphone. The speaker is configured to convert the electrical signal from the processor 1701 or the RF circuit 1704 into the sound wave. The speaker may be a conventional film speaker, or may be a piezoelectric ceramic speaker. When the speaker is the piezoelectric ceramic speaker, the speaker not only may convert the electric signal into a sound wave audible to a human being, but also may convert the electric signal into a sound wave inaudible to a human being, for ranging and other purposes. In some embodiments, the audio circuit 1707 may further include a headphone jack.

The power supply 1709 is configured to supply power to components in the terminal 1700. The power supply 1709 may be an alternating current, a direct current, a primary battery, or a rechargeable battery. When the power supply 1709 includes the rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a quick charge technology.

Embodiments of this application further provide a non-transitory computer-readable storage medium. The computer-readable storage medium stores at least one piece of computer program, and the at least one piece of computer program is loaded and executed by a processor of a terminal to implement the operations performed by the terminal in the display method of a scene picture of the above-mentioned embodiments. For example, the computer-readable storage medium may be a read-only memory (ROM), a random access memory (RAM), a compact disc read-only memory (CD-ROM), a magnetic tape, a floppy disk, an optical data storage device, etc.

Embodiments of this application further provide a computer program product. The computer program product includes computer program code stored in a non-transitory computer-readable storage medium. A processor of a terminal reads the computer program code from the computer-readable storage medium, and the processor executes the computer program code to cause the terminal to perform the display method of a scene picture provided in the various implementations.

A person skilled in the art may understand that all or some of the steps of the foregoing embodiments may be implemented by using hardware, or may be implemented by a program instructing relevant hardware. The program may be stored in a computer readable storage medium. The above-mentioned storage medium may be the ROM, a disk, an optical disc, etc.

The foregoing descriptions are merely embodiments of this application, but are not intended to limit this application. Any modification, equivalent replacement, or improvement made within the spirit and principle of this application shall fall within the protection scope of this application.

What is claimed is:

1. A method of displaying a scene picture performed by a computer device, the method comprising:

displaying a two-dimensional scene picture of a three-dimensional virtual scene, the scene picture including a virtual object;

in response to a triggering condition being met, photographing a sequence of actions performed by the virtual object in the three-dimensional virtual scene based on a photographing trajectory of a virtual camera to obtain a three-dimensional animation corresponding to the virtual scene;

playing the three-dimensional animation corresponding to the virtual scene;

in response to completing playing the three-dimensional animation, rendering the virtual object in a preset size and a preset perspective angle in the two-dimensional scene picture of the virtual scene, the size and the perspective angle of the virtual object remaining the same as a last size and a last perspective angle of the virtual object at an end of the photographing trajectory of the virtual camera;

performing perspective correction on the virtual object displayed in the two-dimensional scene picture of the virtual scene; and displaying the virtual object in a target posture at a target position in the two-dimensional scene picture, the size and the perspective angle of the virtual object remaining unchanged when the virtual object translates in the two-dimensional scene picture.

2. The method according to claim 1, wherein the perspective angle indicating an angle at which the virtual object is displayed.

3. The method according to claim 1, wherein the photographing trajectory comprises rotation operation of the virtual camera, and the method further comprising:

determining the rotation operation of the virtual camera based on the preset perspective angle of the virtual object in the two-dimensional scene picture.

4. The method according to claim 1, further comprising:

determining the target position and the target posture based on the last frame of the three-dimensional animation;

discarding the last frame of the three-dimensional animation.

5. The method according to claim 4, further comprising:

rendering a two-dimensional target virtual background aligned with the last frame of the three-dimensional animation, the target virtual background indicating pictures other than the virtual object;

combining the rendered virtual object and the rendered target virtual background to obtain the two-dimensional scene picture of the virtual scene.

6. The method according to claim 1, wherein the triggering condition comprises at least one of: a skill triggering event or a cutscene triggering event.

7. A computer device comprising a processor and a memory, the memory storing at least one computer program, the at least one computer program being executed by the processor and causing the computer device to perform a method of displaying a scene picture including:

displaying a two-dimensional scene picture of a three-dimensional virtual scene, the scene picture including a virtual object;

in response to a triggering condition being met, photographing a sequence of actions performed by the virtual object in the three-dimensional virtual scene based on a photographing trajectory of a virtual camera to obtain a three-dimensional animation corresponding to the virtual scene;

playing the three-dimensional animation corresponding to the virtual scene;

in response to completing playing the three-dimensional animation, rendering the virtual object in a preset size and a preset perspective angle in the two-dimensional scene picture of the virtual scene, the size and the perspective angle of the virtual object remaining the same as a last size and a last perspective angle of the virtual object at an end of the photographing trajectory of the virtual camera;

performing perspective correction on the virtual object displayed in the two-dimensional scene picture of the virtual scene; and displaying the virtual object in a target posture at a target position in the two-dimensional scene picture, the size and the perspective angle of the virtual object remaining unchanged when the virtual object translates in the two-dimensional scene picture.

8. The computer device according to claim 7, wherein the perspective angle indicating an angle at which the virtual object is displayed.

9. The computer device according to claim 7, wherein the photographing trajectory comprises rotation operation of the virtual camera, and the method further comprising:

determining the rotation operation of the virtual camera based on the preset perspective angle of the virtual object in the two-dimensional scene picture.

10. The computer device according to claim 7, wherein the method further comprises:

determining the target position and the target posture based on the last frame of the three-dimensional animation; and discarding the last frame of the three-dimensional animation.

11. The computer device according to claim 10, wherein the method further comprises:

rendering a two-dimensional target virtual background aligned with the last frame of the three-dimensional animation, the target virtual background indicating pictures other than the virtual object;

combining the rendered virtual object and the rendered target virtual background to obtain the two-dimensional scene picture of the virtual scene.

12. The computer device according to claim 7, wherein the triggering condition comprises at least one of: a skill triggering event or a cutscene triggering event.

13. A non-transitory computer-readable storage medium storing at least one computer program, the at least one computer program being executed by a processor of a computer device and causing the computer device to perform a method of displaying a scene picture including:

displaying a two-dimensional scene picture of a three-dimensional virtual scene, the scene picture including a virtual object;

in response to a triggering condition being met, photographing a sequence of actions performed by the virtual object in the three-dimensional virtual scene based on a photographing trajectory of a virtual camera to obtain a three-dimensional animation corresponding to the virtual scene;

playing the three-dimensional animation corresponding to the virtual scene;

in response to completing playing the three-dimensional animation, rendering the virtual object in a preset size and a preset perspective angle in the two-dimensional scene picture of the virtual scene, the size and the perspective angle of the virtual object remaining the same as a last size and a last perspective angle of the virtual object at an end of the photographing trajectory of the virtual camera;

performing perspective correction on the virtual object displayed in the two-dimensional scene picture of the virtual scene; and displaying the virtual object in a target posture at a target position in the two-dimensional scene picture, the size and the perspective angle of the virtual object remaining unchanged when the virtual object translates in the two-dimensional scene picture.

14. The non-transitory computer-readable storage medium according to claim 13, wherein the perspective angle indicating an angle at which the virtual object is displayed.

15. The non-transitory computer-readable storage medium according to claim 13, wherein the triggering condition comprises at least one of: a skill triggering event or a cutscene triggering event.

16. The non-transitory computer-readable storage medium according to claim 13, wherein the photographing trajectory comprises rotation operation of the virtual camera, and the method further comprising:

determining the rotation operation of the virtual camera based on the preset perspective angle of the virtual object in the two-dimensional scene picture.

17. The non-transitory computer-readable storage medium according to claim 13, wherein the method further comprises:

determining the target position and the target posture based on the last frame of the three-dimensional animation; and discarding the last frame of the three-dimensional animation.

18. The non-transitory computer-readable storage medium according to claim 17, wherein the method further comprises:

rendering a two-dimensional target virtual background aligned with the last frame of the three-dimensional animation, the target virtual background indicating pictures other than the virtual object;

combining the rendered virtual object and the rendered target virtual background to obtain the two-dimensional scene picture of the virtual scene.

* * * * *